United States Patent [19]

Sekella

[11] Patent Number: 4,582,187

[45] Date of Patent: Apr. 15, 1986

[54] SELF-ADJUSTING ELECTROMAGNETIC CONE BRAKE WITH OVERRUNNING ADJUSTMENT ASSEMBLY

[75] Inventor: Thomas C. Sekella, Elmira, N.Y.

[73] Assignee: Facet Enterprises Inc., Tulsa, Okla.

[21] Appl. No.: 493,470

[22] Filed: May 11, 1983

Related U.S. Application Data

[63] Continuation-in-part of Ser. No. 336,103, Dec. 30, 1981.

[51] Int. Cl.[4] .................. F16D 13/75; F16D 27/10; F16D 65/52
[52] U.S. Cl. .................. 192/90; 188/71.9; 192/111 A
[58] Field of Search .................. 192/111 A, 84 B, 90; 188/71.9, 196 F

[56] References Cited

U.S. PATENT DOCUMENTS

| | | | |
|---|---|---|---|
| 3,942,610 | 3/1976 | Klaue | 192/111 A X |
| 3,994,379 | 11/1976 | Miller et al. | 192/111 A |
| 4,030,583 | 6/1977 | Miller | 192/111 A X |
| 4,175,650 | 11/1979 | Miller | 192/111 A X |
| 4,187,938 | 2/1980 | Miller | 192/84 C X |
| 4,194,610 | 3/1980 | Miller | 192/111 A |
| 4,258,836 | 3/1981 | Miller | 192/111 A X |
| 4,416,359 | 11/1983 | Miller | 192/111 A X |

*Primary Examiner*—Rodney H. Bonck
*Attorney, Agent, or Firm*—Remy J. VanOphem

[57] ABSTRACT

An electromagnetic friction device for torque transmission, such device including an input member, and a mechanism for transmitting torque from the input member to an output member. The torque transmitting mechanism includes a friction ring member interposed the input member and the output member, a biasing member urging the friction ring into engagement with the input member, and a selectively operable biasing member, such as an electromagnetic device, for selectively biasing the friction ring member away from engagement with the input member. The torque transmitting mechanism further includes an overrunning adjustable abutment device interposed the friction ring and the input member to limit motion of the friction ring member towards the input member and thereby limit the torque frictionally absorbed therebetween. The adjustable abutment device is automatically operable to adjust the position of the friction ring member when the electromagnetic device is inoperative and the input member is rotating in a predetermined angular direction. The adjustable abutment device includes a first adjustment member threadably interconnected with the friction ring member, a second adjustment member interposed between the first adjustment member and the input member, at least one ball interposed the adjustment members and residing in partial raceways in the adjustment members, a ramp in at least one of the raceways, and a biasing element biasing the adjustment members together.

16 Claims, 5 Drawing Figures

SELF-ADJUSTING ELECTROMAGNETIC CONE BRAKE WITH OVERRUNNING ADJUSTMENT ASSEMBLY

CROSS REFERENCE TO CO-PENDING APPLICATIONS

The present application is a continuation-in-part application of copending U.S. patent application Ser. No. 336,103, filed Dec. 30, 1981.

FIELD OF THE INVENTION

This invention relates to electromagnetically actuated frictional devices and more specifically an electromagnetic self-adjusting cone brake which incorporates a fail safe feature actuating the brake upon a power failure, while also providing a frictional retarder and self-adjusting air gap mechanism to extend the life of the brake.

BACKGROUND OF THE INVENTION

Fail safe electromagnetically operated brake devices have been found to be particularly desirable in applications where an electrical power failure is a possibility. In those applications it is desirable, upon the loss of electrical power, to engage the brake in order to bring a device to a complete standstill condition and to maintain the standstill condition until power has been restored. For example, in an electric lift truck, it would be desirable, in the case of an electrical system failure, to stop the forks in the position that they attained prior to the electrical failure. This would insure that the lift, with its heavy load, would not drop to the floor and cause serious damage. Also, in a lift truck, the fail safe electromagnetic brake can be used when the engine stalls so that the truck would come to a complete standstill condition upon power failure.

Other uses of this type of device are in an elevator where it would be necessary to stop the elevator in case of a power failure. Thus, in general, the fail safe electromagnetic brake is used in any application where it is desired, in case of a loss of electrical power, to stop functioning of certain electrical components to avoid a major breakdown or disaster.

Such applications place particular requirements on the brake device in that, generally, the brake device must be simple and economically constructed and at the same time provide positive engagement under a high torque absorption in order to enable the mechanical system in which the brake is utilized to safely avoid continuation of the event cycle. A break in such a system may be either off or on for long periods of time or cycled on and off for short periods of time depending on the application requirements. Thus, the brake must be sufficiently durable to withstand constant use with a minimum amount of wear.

DESCRIPTION OF THE PRIOR ART

One prior art design utilizing an electromagnetic clutch or brake with a self-adjusting feature is shown in Miller et al, U.S. Pat. No. 3,994,379, owned by the assignee of the present application. In this embodiment, the friction member is threadably engaged to an armature with relative motion in one direction prevented between the armature and the friction member by a self-adjusting retarder. The fingers of the retarder act upon a knurled surface on the armature to prevent relative motion in one direction between the armature and the friction member on disengaging of the electromagnetic coil. The retarder member only permits the armature to rotate in one direction relative to the friction member, that is, as the frictional surface wears away. As wear occurs, and the electromagnetic coil is energized, the rotating armature and friction member are moved axially towards the pole faces. The rotational velocity of the armature is decreased by the static condition of the pole faces. The friction cone member which continues to rotate at the input shaft speed is caused to move axially forward along the mutually engageable thread between the friction member and the armature, that is, towards the brake, thereby advancing the friction surface of the friction member into engagement with its mating surface to apply the brake.

This self-adjusting brake device is, however, complex, difficult to assemble and expensive to manufacture. Further, it has been found that it is difficult to make and expensive because of the many manufacturing steps required to form the retarder member. Furthermore, while this device is self-adjusting it is not fail safe.

A further improvement to the aforementioned design is shown in Miller, U.S. Pat. No. 4,030,583, also owned by the assignee of the present application. U.S. Pat. No. 4,030,583 teaches a fail safe electromagnetic cone clutch or brake device for transmitting torque from an input means to an output means. The input means includes a clutch actuating mechanism including an electromagnetic winding, and an armature coaxially disposed with the input means and threadably connected to a driving friction ring member. The driving friction ring member is splined to move axially on an inner body member which is mounted to the input shaft. When the clutch is de-energized, biasing springs move the friction cone ring member against the output means, thus, transmitting torque from the friction ring to the output means. When the electromagnetic winding is energized, a circular flux path is generated between the inner body member and the armature located adjacent to the inner body member. The armature is threadably connected to the friction ring member. When the electromagnetic winding is energized, the armature pulls the friction ring member away from the output means thereby stopping the transmittal of torque from the input means to the output means. The friction device maintains this position until the electromagnetic winding is again de-energized. A retarder member is disposed adjacent to the armature to permit engagement of the friction ring member to the output means without adverse wear on the armature. The retarder member has a plurality of tabs on its outer diameter corresponding to a plurality of grooves on the inner surface of the opposite end portion of the friction ring member.

This fail safe self-adjusting brake is, however, also complex, difficult to assemble, and expensive to manufacture. In particular, knurling the opposite face of the armature member has proven to be difficult in production. In addition, the retarder member with its plurality of tabs and spring-like fingers is expensive to make. Further, this device permits excessive overadjustment of the armature member relative to the friction member.

None of the above mentioned designs provided a simple, reliable, self-adjusting, fail safe electromagnetic brake which prevented excessive overadjustment during the wear compensating mode and provided a retarder member which was inexpensive and simple to make.

In a co-pending application filed Dec. 30, 1981, Ser. No. 336,103, of the same inventor as in the present application, a fail safe electromagnetic brake device providing a simple, inexpensive, unidirectional retarder member is disclosed. The retarder member provides a controlled rotational drag between an armature member and a friction ring member during the wear compensating mode to avoid excessive overadjustment as well as random rotation of the armature member relative to the friction member when the electromagnet is de-energized.

This fail safe electromagnetic brake device provides an electromagnetic cone friction device for torque transmission from an input means to an output means, utilizing a torque transmission mechanism. The output means is coaxially disposed with the input means. The torque transmitting mechanism further includes an adjustable friction ring member, an inner ring member coaxially disposed with the adjustable ring member, and a biasing mechanism urging the adjustable friction ring member into engagement with the input means. In addition, an electromagnetic mechanism for actuating the friction ring member out of engagement with the output means is also provided. The electromagnetic actuating mechanism is mounted adjacent to the output means. The electromagnetic actuating mechanism includes a magnetic armature member mounted adjacent to the adjustable friction ring member and a mechanism for adjusting the electromagnetic armature with respect to the adjustable friction ring member.

For many applications, the above described device functions well. However, one of the problems associated with using an air gap self-adjuster in a clutch or brake which rotates in both directions is the need to prevent threaded parts from rotating in an undesired direction. When the torque applied to the inner ring is small, there is little difficulty. However, when this torque is large, an undesirable rotation of the inner ring relative to the friction ring may occur.

Therefore, what is needed is a fail safe electromagnetic brake having all of the advantages and features of the brake described in the above mentioned co-pending application, but incorporating certain modifications to prevent the unintentional rotation of these internal components.

SUMMARY OF THE INVENTION

The present invention relates to fail safe electromagnetic brake devices and provides a simple and inexpensive retarder member which provides a controlled rotational drag between an armature member and two friction rings when the electromagnet is energized as well as rotation of the armature member relative to the friction member when the electromagnet is de-energized. Wear compensation adjustment occurs between the friction member and the armature member when the retarder member rotates in one angular direction.

The present invention provides an electromagnetic cone friction device for torque transmission from an input means to an output means utilizing a torque transmission mechanism. The output means is coaxially disposed with the input means. The torque transmitting mechanism further includes an adjustable friction ring member, an inner ring assembly coaxially disposed with the adjustable friction ring member and a biasing mechanism which urges the adjustable friction ring member into engagement with the input means. In addition, an electromagnetic mechanism for actuating the friction ring member out of engagement with the output means is also provided. The electromagnetic actuating mechanism is mounted adjacent to the output means. The electromagnetic actuating means includes a magnetic armature member mounted adjacent to the adjustable friction ring member and a mechanism for adjusting the electromagnetic armature with respect to the adjustable friction ring member.

The input ring assembly has two plates or rings and a plurality of balls disposed therebetween. The balls are trapped within raceways in the respective rings. At least one spring biases the rings together. At least one of the rings is provided with a ramp contour whereby, when the rings are rotated relative to each other in one position, the gap therebetween may be varied between two preselected distances. Each of the raceways is provided with abutments whereby torque may be transmitted between the rings in either angular direction after the ball has been shifted along the raceways a predetermined angular distance. The inner ring assembly may, therefore, transfer a substantial amount of torque in one angular direction to provide adjustment of the friction ring member providing a very small amount of torque in the opposite angular direction so as to avoid inadvertent rotation of the inner ring member to drive the friction ring member out of adjustment.

It is, therefore, a primary object of the present invention to provide an electromagnetic friction device with a simple and economical thread adjustment member which provides a controlled rotational drag on the thread of the friction ring member to prevent overadjustment during the wear compensation phase and to prevent relative motion between the armature plate and the friction ring member when the electromagnetic coil is energized yet which avoids inadvertent maladjustment when the input means is rotated in the opposite relative angular direction from the angular direction required for wear compensation adjustment.

Another object of this invention is to provide an electromagnetic clutch or brake which has a simplified wear compensator member to automatically maintain the clutch armature in close relative engagement with the electromagnetic pole faces regardless of the wear experienced by the torque transmitting friction member and to prevent excessive overadjustment during the wear compensation mode by providing a drag on the thread surfaces and yet prevent the armature and inner ring from drifting rotatably along the threads within the friction member.

Another object of this invention is to provide an efficient electromagnetic fail safe brake with a new and economical wear compensating mechanism. Other objects and advantages of this invention will become apparent from the following detailed description taken in conjunction with the accompanying drawings.

The many objects, features, and advantages of the present invention will become apparent to one skilled in the art when the following detailed description of the preferred embodiment is read in conjunction with the drawings.

DETAILED DESCRIPTION OF THE PREFERRED EMBODIMENT

Figure 1:
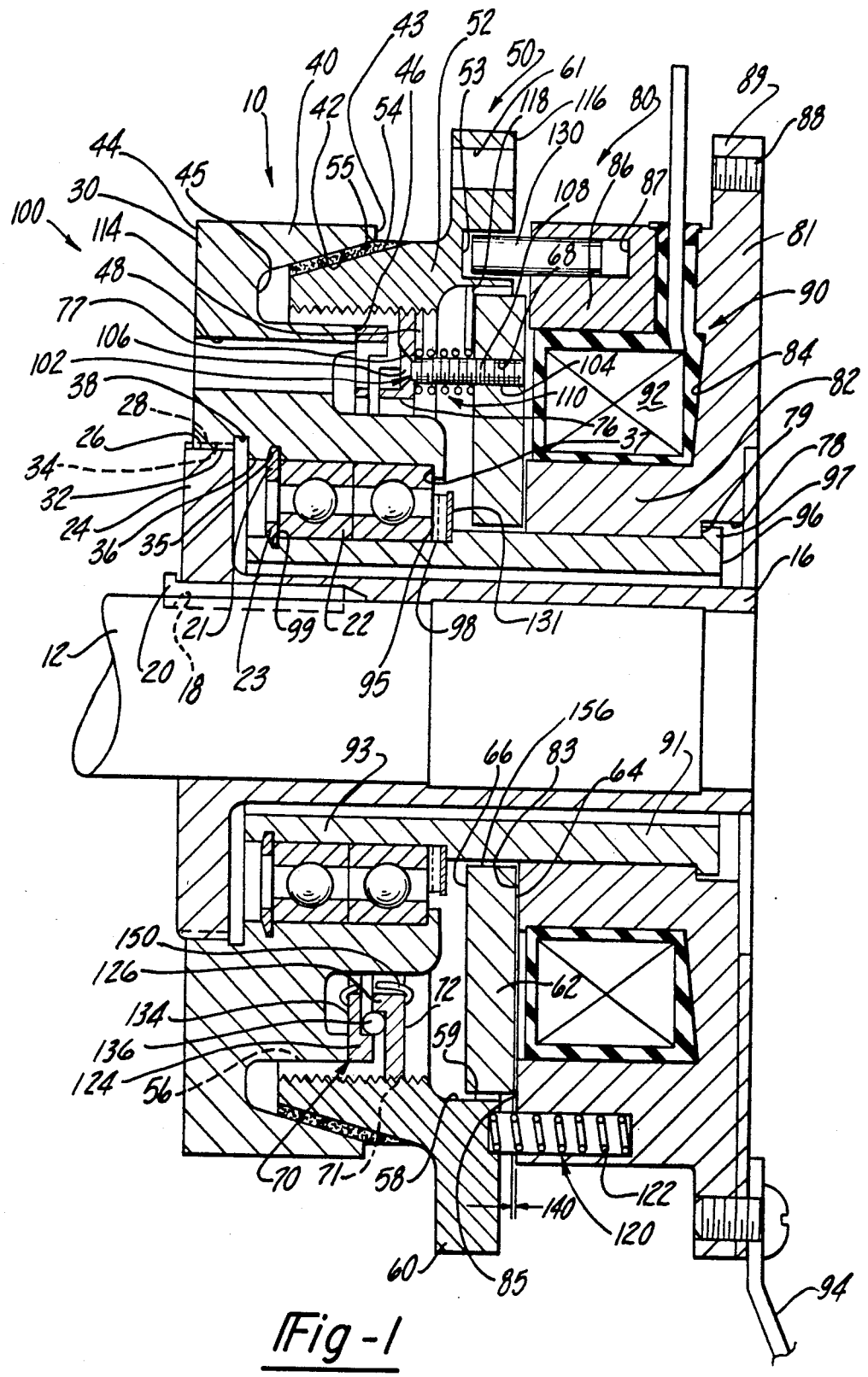
FIG. 1 is a partial sectional view of the preferred embodiment of the invention showing the torque transmitting elements in the engaged position.

Referring to FIG. 1, an electromagnetic friction clutch or brake for transmitting torque from an input means 10 which serves as a first rotational element, to a stationary output means 80, which serves as a second rotational element, is generally designated by the reference numeral 100. The electromagnetic friction brake 100 includes a friction means 50 which serves as torque translating means to translate torque from the input means 10 to the stationary output means 80.

The input means 10 includes an input shaft 12, a sleeve 16 and an outer member 30. The sleeve 16 is mounted on the input shaft 12 and constrained to rotate therewith by means of a key 20 extending radially from the sleeve 16 and a keyway 18 in the input shaft 12. The sleeve 16 further has a radially extending portion 24 formed at one end thereof. The radially extending portion 24 has an outer cylindrical surface 26 upon which a plurality of axial splines 28 are formed.

The outer member 30 has a plurality of cooperating axial splines 32 formed on a first or partial bore 34 formed axially therethrough for cooperative engagement with the axial splines 28 on the cylindrical surface 26 of the radially extending portion 24. The outer member 30 further has a second axial bore 36 therethrough having a diameter which is smaller than the diameter of the first bore 34. Between the first bore 34 and the second bore 36 is a counterbore 38 provided for a purpose to be described later herein. The outer member 30 has a pair of opposing annular surfaces 43 and 44. One surface 43 of the outer member 30 has a concave frusto-conical annular portion 40 with an inner frusto-conical surface 42 which is tapered radially inwardly towards the axis of the outer member 30. The outer member 30 is the principal torque transmitting member of the input means 10. Although the frusto-conical portion 40 is shown in FIG. 1 as being integrally formed at part of the outer member 30, it is optionally possible to form a separate annular element having a frusto-conical portion 40 and secure it to the outer member 30. Alternatively, it is possible to fasten friction material to the frusto-conical surface 42 of the frusto-conical portion 40. Between the surfaces 43 and 44 of the outer member 30, extends a cavity 45 from the one surface 43 towards the other surface 44 and near the outer diameter of the outer member 30. The outer member 30 further has an additional inner annular surface 46 which is normal to the axis of the input shaft 12 and is provided for a purpose to be described later herein. The outer member 30 further has a plurality of apertures 48 which extend from the surface 44 to the inner annular surface 46.

The output means 80 includes two concentrically disposed body portions 82 and 86 which form one integral output body 81. In order to establish two separate flux conducting surfaces, the radially inner body portion 82 of the output body 81 is separated from the radially outer body portion 86 thereof by an annular recess or cavity 84. This feature facilitates establishing two poles as is well known in the art and will not be discussed further.

Electromagnetic actuating means 90 are provided including an electromagnetic winding or coil 92 which is disposed within the annular cavity 84 in the output means 80 and is retained therein by any suitable adhesive, such as epoxy. The coil 92 may be manufactured from copper wire or any other suitable material and is suitably connected to a D.C. power source and an electrical control means (not shown). The electromagnetic actuating means 90 and the body portions 82 and 86 are axially fixed and nonrotatably mounted in an appropriate manner. For this purpose, the output means has thread apertures 88 on the flange portion 89 attached to its outer diameter which may be suitably secured to a stationary member 94.

The output means 80 further includes an intermediate elongated annular sleeve member 96 which is disposed concentric to the sleeve 16 and the input shaft 12. The inner diameter of the intermediate annular sleeve member 96 is larger than the outer diameter of the sleeve 16 so that there is no connection between the sleeve 16 and the intermediate annular sleeve member 96. The intermediate annular sleeve member 96 has a radially extending portion 97 at one of its ends which abuts against a shoulder 79 in a counterbore 78 of the output means 80. The outer diameter of the intermediate annular sleeve member 96 is slightly larger than the inner diameter of the output means 80 and these elements are press-fitted together. The intermediate annular sleeve member 96 further extends axially from the radially extending portion 97 in the input means 10 towards the center of the second bore 36 in the outer member 30. An annular shoulder 98 is formed therealong between two portions 91 and 93 thereof having differing outer diameters. The inner body portion 82 is mounted on the outer diameter of the portion 91 nearest the radially extending portion 97. The outer diameter of the portion 93 of the intermediate annular sleeve member 96 extends within the second bore 36 through the outer member 30. The outer member 30 is mounted to the intermediate annular sleeve member 96 by a pair of conventional ball bearing members 22 which are mounted between the second bore 36 of the outer member 30 and the other outer diameter of the portion 93 of the intermediate annular sleeve member 96.

A radial shoulder 37 extends radially inwardly from the second bore 36 to abut one face of the ball bearing members 22. A first retainer ring 21 fits in an appropriate groove 35 in the second bore 36 of the outer member 30. A second retainer ring 23 is mounted in an appropriate groove 99 of the intermediate annular sleeve member 96. The outer member 30 is secured against an axial movement along the intermediate annular sleeve member 96 by the cooperation of the radial shoulder 37 and the retainer rings 21 and 23. Between the radial shoulder 98 of the intermediate annular member 96 and the one face of the ball bearing member 22 along the second inner diameter of the intermediate annular sleeve member 96 is disposed a wave spring washer 95 and a flat washer 131 to take up any accumulated manufacturing tolerances.

The torque translating means 50 are provided between the input means 10 and the output means 80. The torque translating means 50 includes the electromagnetic actuating means 90, which serves as a biasing means, an adjustable friction ring member 52, and annular armature member 62, an inner ring assembly 70, connecting means 102, biasing means 110, biasing means 120 and pin members 130. The annular armature member 62, the adjustable friction ring member 52, and the inner ring assembly 70 are disposed coaxially with the input shaft 12.

The adjustable friction ring member 52 is concave and generally frusto-conically shaped in cross-section and has a radially inwardly sloping frusto-conical surface 54 to which friction material 55 is fastened. The friction material 55 on the frusto-conical surface 54 of the adjustable friction ring member 52 is adapted to frictionally engage with the mating frusto-conical surface 42 of the frusto-conical annular portion 40 of the outer member 30. The adjustable friction ring member 52 further has a threaded first bore 56 adjacent to one end thereof and coaxial with the input shaft 12. The adjustable friction ring member 52 further has an annular flange 60 extending radially therefrom and a second bore 58 adjacent to the annular flange and coaxial with the input shaft 12. The second bore 58 extends partly from the surface 116 thereof towards the one end with the diameter of the second bore being larger than that of the threaded first bore 56. The second bore 58 has a knurled surface 59 cooperating with the biasing means 110 in a manner to be described later herein.

The annular armature member 62 has an outer diameter which is substantially smaller than the inner diameter of the second bore 58 of the adjustable friction ring member 52 and is coaxially disposed at least partially within the second bore 58. The annular armature member 62 further has an axial bore 156 therethrough having an inner diameter which is substantially larger than the outer diameter of the portion 91 of the intermediate annular sleeve member 96. The annular armature member 62 has a first face 64 which is normal to the input shaft axis and adjacent to the pole face 83 of the inner body portion 82 of the output body 81 and the pole face 85 formed on the outer body portion 86 thereof. The annular armature member 62 further has a second face portion 66 which is opposite to the first face 64. Several threaded holes or apertures 68 are formed in the annular armature member 62 and extend from the second face 66 to the first face 64 of the connecting means 102, described later herein.

The inner ring assembly 70, which serves as an adjustable overrunning assembly includes an overrunning ring 124, which serves as a first adjustment member an adjusting ring 126, which serves as a second adjustment member, and a plurality, preferably three, of balls 136 interposed the adjusting ring and the overrunning ring.

Figure 3:
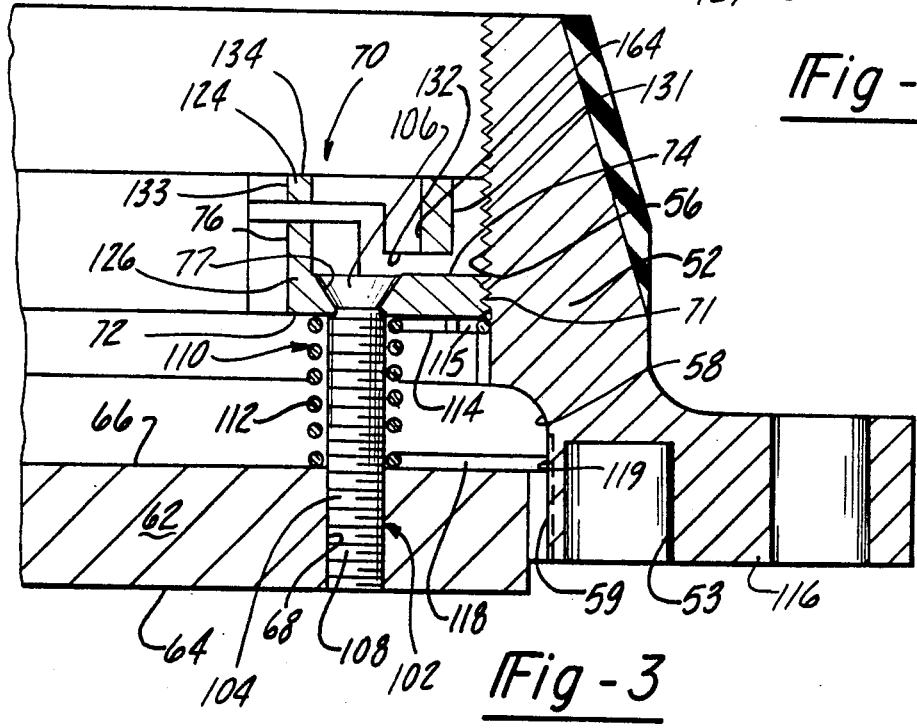

The adjusting ring 126, as best shown in FIG. 3, has a threaded outer cylindrical surface 71 which cooperatively engages the threaded first inner bore 56 of the adjustable friction ring member 52. The adjusting ring 126 has a first annular face 72 which is disposed adjacent and parallel to the second face 66 of the annular armature member 62. The adjusting ring 126 further has a second and opposite annular face 74 and a large central aperture 76 which extends from the first annular face 72 through the second annular face 74. In addition, a plurality, preferably three, of conical counterbores 77 extend partially from the second annular face 74 towards the first annular face 72 and form conical shoulders between the second annular face 74 and the first annular face 72 of the adjusting ring 126.

The overrunning ring 124 has a first annular face 132 adjacent to the second annular face 74 of the adjusting ring 126 and a second annular face 134 disposed opposite the first annular face. The overrunning ring 124 further has an outer cylindrical surface 129 and a large central aperture 133. The outer diameter of the overrunning ring 124 is smaller than the outer diameter of the adjusting ring 126.

Figure 4:
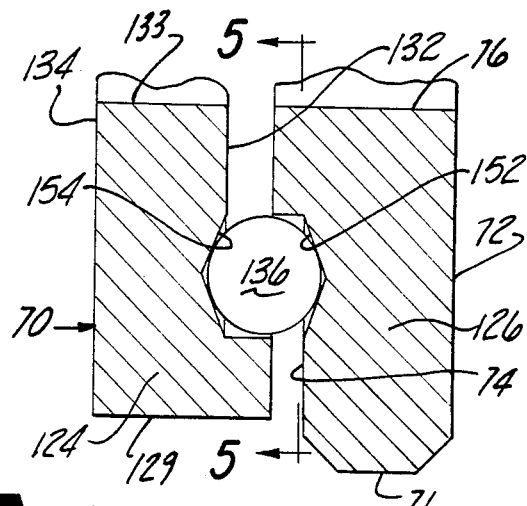
FIGS. 3 and 4 are enlarged partial sectional views similar to FIG. 1 illustrating portions of the inner ring assembly and adjacent elements.

The plurality of balls 136 (FIGS. 4 and 5) are provided between the adjusting ring 126 and the overrunning ring 124. Each of the balls 136 is provided with a partial raceway 138a in the overrunning ring 124 and a partial raceway 138b in the adjusting ring 126. Together, the raceways 138a and 138b trap the ball 136 so as to prevent separation of the balls 136 from the inner ring assembly 70. Each of the raceways 138a and 138b are provided with abutments, 142 and 144 in the case of the raceway 138a and 146 and 148 in the case of the raceway 138b, that cooperate with the respective ball 136 to limit the relative angular rotation of the adjusting ring 126 relative to the overrunning ring 124 in either angular direction.

Figure 5:
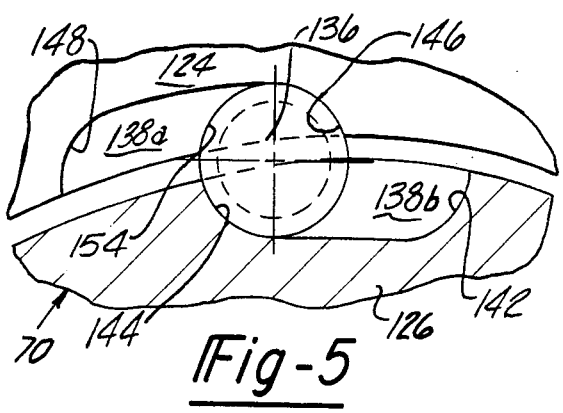
FIG. 5 is a schematic sectional view taken substantially along line 5—5 of FIG. 4.

A plurality of springs 150 (FIG. 1) are provided around the inner ring assembly 70 to secure the elements together and to bias the adjusting ring 126 and the overrunning ring 124 together. Ramp means are provided in at least one of the raceways 138a and 138b (FIG. 5) whereby the spacing between the adjusting ring 126 and the overrunning ring 124 varies from one relative angular position of the rings 124 and 126 to the other extreme relative angular position of these rings. In an example illustrated in the drawing, the ramp means includes a tapered cavity 152 and a tapered cavity 154 (FIG. 4) in each of the raceways 138a and 138b. One of the balls 136 is illustrated in FIG. 5 in one extreme relative position of the rings 124 and 126 wherein the ball is resting in both tapered cavities 152 and 154.

The overrunning ring 124 is further provided with a plurality, preferably three, of apertures 164 (FIG. 3) extending between the faces 134 and 132 thereof disposed at predetermined locations away from the raceways 138a and 138b. The apertures 48 (FIG. 1) formed in the outer member 30 are aligned with the conical counterbore 77 and the aperture 164 of the inner ring assembly 70 (FIG. 3) as well as the threaded aperture 68 of the annular armature member 62 for reasons which will become apparent shortly. The adjusting ring 126 is connected to the annular armature member 62 by connecting means 102. The preferred connecting means 102 is illustrated and consists of a threaded member 104 having a head portion 106 and a threaded neck portion 108. The threaded member 104 is inserted through the aperture 48, the aperture 164 and the conical counterbore 77. The thread neck portion 108 of the threaded member 104 engages the threads in the threaded aperture 68 of the annular armature member 62. The head portion 106 of the threaded member 104 further abuts the conical surface of the counterbore 77 to permit adjustment of the annular armature member 62 relative to the inner ring assembly 70 by rotation of the threaded member 104, thereby to permit adjustment of the air gap 140 (FIG. 1).

Figure 2:
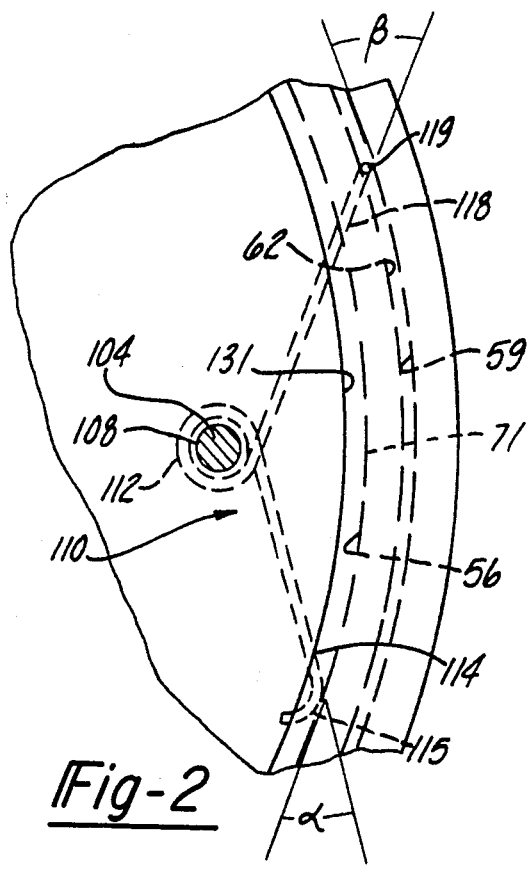
FIG. 2 is a fragmentary sectional view showing the armature member, inner body member, friction ring member, threaded connector and the wear compensating member.

With reference to FIGS. 1 and 3, the biasing means 110 is mounted between the second face 66 of the annular armature member 62 and the first annular face 72 of the adjusting ring 126. The biasing means 110 includes a helical biasing member having a coiled body portion 112 which is mounted around the threaded neck portion 108 of the threaded member 104. The helical member further has a first radial end portion 114 and a second radial end portion 118. The first radial end portion 114 is adjacent to the first annular face 72 of the adjusting ring 126 and the second radial end portion 118 is adjacent to the second face 66 of the annular armature member 62. The first radial end portion 114 further has an arcuately shaped end 115 (FIGS. 2 and 3) which slidably engages the root diameter of the threaded first inner bore 56 of the adjustable friction ring member 52. Thus, as best shown in FIG. 2, the first radial end portion 114 extends radially of the coiled body portion 112 such that when the arcuately shaped end 115 engages the threaded first inner bore 56 of the adjustable friction ring member 52, the first radial end portion 114 forms an angle, (alpha α, in FIG. 2) to the threaded first inner bore 56.

Similarly, the second radial end portion 118 also extends radially from the coiled body portion 112 in a direction away from the coiled body portion 112. The second radial end portion 118 further has an abutment end 119 which engages the knurled surface 59 on the second inner bore 58 of the adjustable friction ring member 52. In addition, the second radial end portion 118 forms an angle, (beta β, FIG. 2) with the knurled surface 59. In the preferred embodiment, the angle beta is less than 90°. The first radial end portion 114 and the second radial end portion 118 extend radially from the coiled body portion 112 so that each end portion develops a biasing force in order to insure that the arcuately shaped end 115 is urged into contact with the threaded first inner bore 56 of the adjustable friction ring member 52 and the abutment end 119 is likewise urged into engagement with the knurled surface 59 of the adjustable friction ring member 52.

The adjustable friction ring member 52 is connected to the output means 80 by means of a plurality of pin members 130. The pin members 130 are disposed in opposing recesses formed in the adjustable friction ring member 52 and the output body 81. For this purpose, as shown in FIG. 1, the radially outer body portion 86 of the output body 81 has a plurality of axially extending recesses 87 in the pole face 85. Similarly, a plurality of opposing axially extending recesses 53 are formed in the face 116 of the adjustable friction ring member 52 so as to be opposite the axially extending recesses 87 formed in the output means 80. A pin member 130 is inserted into each of the aligned pairs of axially extending recesses 53 and 87 such that the one end of the pin member is inserted into the axially extending recess 53 in the adjustable friction ring member 52 with a relatively loose sliding fit while the opposite end of the pin member 130 is inserted into the axially extending recess 87 formed in the output means 80 with a relatively tight fit. Thus, the adjustable friction ring member 52 can move axially relative to the axis of the input shaft 12 but is prevented from rotation by the pin members 130.

The biasing means 120 includes a plurality of helical biasing members 122 which are disposed in the alternate axially extending recesses 53 and 87 so as to urge the adjustable friction ring member 52 away from the output means 80. These helical biasing members 122 provide the fail safe feature of the friction brake 100. This fail safe feature causes the engagement of the adjustable friction ring member 52 with the input means 10 in the event of an electrical failure which causes the electromagnetic actuating means 90 to stop functioning.

The friction brake 100 is further provided with a manual release capability so that, in the event of electrical failure, the brake may be released manually. For this purpose, at least one, and preferably two, of the apertures 61 in the annular flange 60 of the adjustable friction ring member 52 are aligned with a corresponding number of the apertures 88 in the annular flange portion 89 of the output means 80. To actuate the manual release, a threaded connector member (not illustrated) is inserted into the aperture 61 of the annular flange 60 so that the threaded portion of the threaded member engages the thread in the aperture 88 of the flange 89 of the output means 80. The head portion of the threaded connector member abuts against one face of the annular flange 60. When the threaded connector member is rotated, the adjustable friction ring member 52 is driven axially in a direction towards the electromagnetic actuating means 90, overcoming the biasing force of the helical biasing members 122 between the adjustable friction ring member 52 and the output means 80. Thus, by rotating the threaded connector member, the first face 64 of the annular armature member 62 is made to abut against the pole faces 83 and 85 of the output body 81 and the friction material 55 is disengaged from the frusto-conical surface 42 on the outer member 30 of the input means 10.

It should be noted that the biasing force of the helical biasing means 110 which is between the annular armature member 62 and the adjusting ring 126 remains constant despite the movement of the adjusting ring 126 and the annular armature member 62 relative to the adjustable friction ring member 52. This is so because the threaded connector member maintains the annular armature member 62 and the inner ring assembly 70 axially fixed relative to each other. However, because the apertures 48 in the outer member 30 are radially aligned with the conical counterbore 77 in the adjusting ring 126 and the aperture 164 in the overrunning ring 124, it is possible to adjust the air gap or distance 140 between the first face 64 of the annular armature member 62 and the pole faces 83 and 85, when the electromagnetic actuating means 90 is de-energized. Furthermore, the friction brake 100 does not have to be disassembled in order to permit this adjustment.

As stated previously with reference to FIG. 1, the adjustable friction ring member 52 has a radially inwardly sloping frusto-conical surface 54 to which friction material 55 is suitably secured. The outer surface of the friction material 55 mounted on the adjustable friction ring member 52 engages the frusto-conical inner surface 42 of the outer member 30 when the electromagnetic coil 92 is de-energized. Thus, torque is transferred from the input shaft 12 through the radially extending portion 24 thereof, through the axial splines 28 and 32, respectively, to the outer member 30. Torque is transferred from the outer member 30 to the adjustable friction ring member 52 by means of frictional force between the frusto-conical inner surface 42 of the input means 10 and the friction material 55 on the adjustable friction ring member 52. Finally the torque is transferred from the adjustable friction ring member 52 through the pin members 130 to the stationary output means 80.

OPERATION OF THE PREFERRED EMBODIMENT

In operation, when the electromagnetic winding 92 is energized, the armature member 62 is moved axially into engagement with the pole faces 83 and 85 of the output body 81. The magnetic engaging forces exerted on the armature member 62 are completely axial and therefore, provide a closed contact between the pole faces 83 and 85 and the armature. Under this energized condition, the adjustable friction ring member 52 remains spaced apart from the mating surface 42 of the outer member 30 of the input means 10. Thus, the outer member 30 and the sleeve 16 may rotate at the speed of the input shaft 12. In addition, the adjustable friction ring member 52 compresses the biasing means 120 in the axially extending recess 87 of the radially outer body portion 86 of the output means 80. Thus, the adjustable friction ring member 52 in this energized condition is under the influence of a compressive spring force which acts in a direction towards the input means 10.

Upon losing power in the electromagnetic circuits supplying power to the coil 92, the biasing means 120 urge the adjustable friction ring member 52 to move axially away from the output means 80. As the adjustable friction ring member 52 moves towards the input means 10, the inner ring assembly 70 and the annular armature member 62 move along with the adjustable friction ring member 52 because of the threaded connection between the threaded first bore 56 and the outer cylindrical surface 71 interconnecting the adjusting ring 126 and the adjustable friction ring member 52 and the connecting means 102 between the adjusting ring 126 and the annular armature member 62. As the adjustable friction ring member 52, the inner ring assembly 70 and the annular armature 62 move towards the input means 10, the inner annular surface 46 of the outer member 30, which is rotating with the input shaft 12, comes into contact with the second annular face 134 of the overrunning ring 124.

When the input means 10 is rotating in a first predetermined angular direction, the overrunning ring 124 of the inner ring assembly 70 is caused to rotate in an angular direction whereby the balls 136 are disposed away from the conical cavities 152 and 154. Therefore, the rings 124 and 126 are driven a first predetermined distance away from each other. The rotation of the inner annular surface 46 of the outer member 30 causes the inner ring assembly 70 to move axially along the threaded connections between the adjusting ring 126 and the adjustable friction ring member 52 towards the output means 80. This permits the surface of the friction material 55 on the frusto-conical surface 54 of the adjustable friction ring member 52, which is non-rotatable by virtue of its connection through the pin member 130 to the output means 80, to advance into engagement with the mating surface 42 on the frusto-conical surface 40 of the outer member 30 of the input means 10. Simultaneously, as the inner ring assembly 70 threads itself along the adjustable friction ring member 52, almost all of the torque is transferred from the input means 10 to the adjustable friction ring member 52 through the mating frictional surfaces of their respective members. The adjustment between the inner ring assembly 70 and the adjustable friction ring member 52 continues until a predetermined amount of torque is transmitted through the mutual frictional surfaces and rotation is halted.

The adjustment referred to above occurs only the first time that the friction brake device 100 is engaged. From this time forward, no additional adjustment occurs between the inner ring assembly 70 and the adjustable friction ring member 52 except to compensate for wear exhibited at the surface of the friction material 55 and the frusto-conical inner surface 42 of the outer member 30. Upon the wearing of either of these surfaces, the inner ring assembly 70 will again, when the electromagnetic coil 92 is de-energized and rotation occurs in the above referenced predetermined direction, adjust itself relative to the adjustable friction ring member and the inner annular surface 46 of the outer member 30 until such time as a predetermined amount of torque is transmitted through the friction brake device 100.

The inner ring assembly 70 and the adjustable friction ring member 52 are maintained in exactly the same position relative to each other as the prior energized position due to the biasing force of the biasing means 110, as described later herein. Furthermore, when rotation of the inner annular surface 46 of the outer member 30 occurs in a direction opposite the predetermined angular direction referred to above, the overrunning ring 124 rotates relative to the adjusting ring 126 and the balls 136 engage the tapered cavities 152 and 154, permitting the spring 150 to bias the rings closer together to provide a second predetermined distance therebetween. This further reduces the torque which would otherwise cause the inner ring assembly 70 to rotate out of adjustment.

The inner ring assembly 70 and the adjustable friction ring member are also maintained in position due to the biasing force of the biasing means 110 as indicated above. The arcuately shaped end 115 of the first radial end portion 114 of the helical biasing member acts on the threaded first bore 56 of the adjustable friction ring member 52 in such a manner as to provide a controlled drag to prevent excessive overadjustment of the inner ring assembly 70 relative to the adjustable friction ring member 52 during a wear adjustment phase, that is, in the direction of relative angular movement of the inner ring assembly 70 relative to the adjustable friction ring member. The inner ring assembly 70 and the adjustable friction ring member 52 are maintained in exactly the same position relative to each other as in the prior energized position by the action of the biasing means 110.

The abutment end 119 of the second radial end portion 118 acts on the knurled surface 59 on the second inner bore 58 of the adjustable friction ring member 52 to inhibit relative motion between the inner ring assembly 70 and the adjustable friction ring member 52 in the opposite direction of the predetermined angular direction. The unidirectional relative motion between the adjustable friction ring member 52 and the inner ring assembly 70 will be permitted to occur for the initial adjustment and thereafter when the frictional surfaces wear away. As wear occurs, the same basic cycle as described above is repeated and continues to occur until all the friction material wears away.

Note, that as wear occurs, there is no loss of torque between the input and output means. The movement between the adjusting ring 126 and the adjustable friction ring member 52 is immediate so as to adjust the position of the adjustable friction ring member 52 to compensate for any wear that occurs at the frictional surfaces. In addition, a controlled drag is provided on the threaded first bore 56 of the adjustable friction ring member 52 to prevent overadjustment of the adjusting ring 126 relative to the adjustable friction ring member 52. Furthermore, the biasing means 110 prevents random relative motion or walking between the inner ring assembly 70 and the adjustable friction ring member 52 because of the biasing force of the first radial end portion 114 acting on the threaded first inner bore 56 of the adjustable friction ring member 52.

Thus, a balance is maintained between the above described elements of the friction brake device 100 to provide constant readjustment in the case of wear of the frictional surfaces. Nonetheless, the biasing means 110, together with the overrunning feature of the inner ring assembly 70 will only permit the inner ring assembly 70, and more particularly, the adjusting ring 126, to rotate in one predetermined angular direction relative to the adjustable friction ring member 52.

While a preferred embodiment of the invention has been disclosed, it will be apparent to those skilled in the art that changes may be made to the invention as set forth in the appended claims. In some instances, certain features of the invention may be used advantageously without corresponding use of other features. Accordingly, the heretofore disclosed description is intended to be illustrative of the principles of the invention and not to limit the scope thereof.

What is claimed as novel is as follows:

1. A friction device for selective prevention of relative rotational motion between a first rotational element and a second rotational element, said friction device comprising:
   friction means interposed said first rotational element and said second rotational element and reciprocably interconnected with said first rotational element such that said friction means is reciprocable towards and away from engagement with said second rotational element and such that said friction means is non-rotatable relative to said first rotational element;
   first biasing means biasing said friction means into engagement with said second rotational element such as to prevent relative rotational motion between said first rotational element and said second rotational element;
   second biasing means biasing said friction means away from engagement with said second rotational element such as to permit relative rotational motion between said first rotational element and said second rotational element, one of said first and second biasing means being selectively operable to overcome the force of the other of said first and second biasing means, such as to permit selective engagement and disengagement of said friction means with said second rotational element;
   adjustable overrunning assembly means interposed said friction means and said second rotational element limiting the motion of said friction means towards said second rotational element, such as to limit the torque frictionally absorbed therebetween, said adjustable abutment means further comprising a first adjustment member threadably interconnected with said friction means, a second adjustment member interposed said first adjustment member and said second rotational element, third biasing means biasing said second adjustment member towards engagement with said first adjustment member, and fourth biasing means biasing said second adjustment member away from said first adjustment member, one of said third and fourth biasing means being selectively operable when said second adjustment member is in engagement with said second rotational element and in response to the direction of rotation of said second rotational element to overcome the other of said third and fourth biasing means such that upon rotation of said second rotational element in a predetermined angular direction relative to said first rotational element and engagement of said second adjustment member with said second rotational element, said adjustment members are biased away from each other to provide a first predetermined amount of torque between said first adjustment member and said friction means for adjustment therebetween and such that, upon rotation of said second rotational element in the rotational direction opposite said predetermined angular direction and engagement of said second adjustment member with said second rotational element, said adjustment members are biased together to provide a second predetermined amount of torque between said first adjustment member and said friction means, said second predetermined amount of torque being less than said first predetermined amount of torque so that said first adjustment member is not rotated out of adjustment with said friction means.

2. The friction device of claim 1 wherein said first and second adjustment members each comprise annular members.

3. The friction device of claim 2 wherein said third biasing means comprises a resilient spring member disposed around both of said adjustment members.

4. The friction device of claim 2 wherein said fourth biasing means comprises:
   a first raceway in said first adjustment member;
   a second raceway in said second adjustment member, said second raceway being disposed adjacent to said first raceway;
   a ball disposed partially in said first raceway and said second raceway;
   abutment means for said ball at opposite ends of both of said first and second raceways such that said ball and said abutment means limit the relative angular motion of said first adjustment member relative to said second adjustment member between a first and a second predetermined angular orientation; and
   ramp means along at least one of said raceways such that said ball biases said first and second adjustment members apart to provide a first predetermined spacing between said first and second adjustment members in one of said predetermined angular orientations and a second predetermined spacing in the other of said predetermined angular orientations.

5. The friction device of claim 4 wherein said ramp means comprises at least one tapered rotational element cavity for said ball in one of said raceways.

6. The friction device of claim 1 wherein said third biasing means comprises a spring wound around both of said first and second adjustment members.

7. The friction device of claim 1 wherein said fourth biasing means comprises:
   a first raceway in said first adjustment member;
   a second raceway in said second adjustment member, said second raceway being disposed adjacent to said first raceway;
   a ball disposed partially in said first raceway and said second raceway;
   abutment means for said ball at opposite ends of both of said first and second raceways such that said ball and said abutment means limit the relative angular motion of said first adjustment member relative to said second adjustment member between a first and second predetermined angular orientation; and
   ramp means along at least one of said raceways such that said ball biases said first and second adjustment members apart to provide a first predetermined spacing between said first and second adjustment members in one of said predetermined angular orientations and a second predetermined spacing in the other of said predetermined angular orientations.

8. The friction device of claim 7 wherein said ramp means comprises at least one tapered cavity for said ball in one of said raceways.

9. A friction device for the selective prevention of relative rotational motion between a first rotational element and a second rotational element, said friction device comprising:

friction means interposed said first rotational element and said second rotational element and reciprocably interconnected with said first rotational element such that said friction means is reciprocable towards and away from engagement with said second rotational element and such that said friction means is non-rotatable relative to said first rotational element;

first biasing means selectively operable to bias said friction means into engagement with said second rotational element such as to prevent relative rotational motion between said first rotational element and said second rotational element;

second biasing means biasing said friction means away from engagement with said second rotational element such as to permit relative rotational motion between said first rotational element and said second rotational element, said second biasing means exerting less force than said selectively operable first biasing means; and adjustable overrunning assembly means interposed said friction means and said second rotational element limiting the motion of said friction means towards said second rotational element such as to limit the torque frictionally absorbed therebetween, said adjustable abutment means further comprising:

(a) a first adjustment member threadably interconnected with said friction means;

(b) a second adjustment member interposed said first adjustment member and said second rotational element;

(c) a first raceway in said first adjustment member;

(d) a second raceway in said second adjustment member adjacent to said first raceway;

(e) a ball disposed partly in said first raceway and partly in said second raceway;

(f) abutments at opposite ends of both of said first and second raceways, said abutments cooperating with said ball to define two extreme predetermined relative angular positions for said first and second adjustment members;

(g) third biasing means biasing said second adjustment member towards said first adjustment member with said ball disposed therebetween; and (h) ramp means disposed within at least one of said raceways such that said adjustment members are spaced a first predetermined distance away from each other in one of said predetermined relative angular positions and a second predetermined distance from each other in the other of said predetermined angular positions.

10. The friction device of claim 9 wherein said first and second adjustment members each comprise annular members.

11. The friction device of claim 9 wherein said third biasing means comprises a resilient spring member disposed around both of said adjustment members.

12. The friction device of claim 9 wherein said ramp means comprises at least one tapered cavity for said ball in one of said raceways.

13. In an electromagnetic friction device for torque transmission having input means, output means, selectively engageable friction means interposed said input means and said output means, adjustment means threadably connected to said friction means, biasing means biasing said friction means into engagement with said input means, selectively operable biasing means biasing said friction means away from engagement with said input means, and adjustable abutment means interposed said friction means and said input means limiting the motion of said friction means towards said input means such as to limit the torque frictionally absorbed therebetween, the improvement wherein said adjustable abutment means further comprises:

a first adjustment member threadably interconnected with said friction means;

a second adjustment member interposed said first adjustment member and said second rotational element;

a first raceway in said first adjustment member;

a second raceway in said second adjustment member adjacent to said first raceway;

a ball disposed partly in said first raceway and partly in said second raceway;

abutments at opposite ends of both of said first and second raceways, said abutments cooperating with said ball to define two extreme predetermined relative angular positions for said first and second adjustment members;

third biasing means biasing said second adjustment member towards said first adjustment member with said ball disposed between said second adjustment member and said first adjustment member; and ramp means disposed within at least one of said first and second raceways such that said first and second adjustment members are spaced a first predetermined distance away from each other in one of said predetermined relative angular positions and a second predetermined distance from each other in the other of said predetermined angular positions.

14. The improvement of claim 13 wherein said first and second adjustment members each comprise annular members.

15. The improvement of claim 13 wherein said third biasing means comprises a resilient spring member disposed around both of said adjustment members.

16. The improvement of claim 13 wherein said ramp means comprises at least one conical cavity for said ball in one of said raceways.

* * * * *

UNITED STATES PATENT AND TRADEMARK OFFICE
CERTIFICATE OF CORRECTION

PATENT NO. : 4,582,187
DATED : April 15, 1986
INVENTOR(S) : Thomas C. Sekella

It is certified that error appears in the above-identified patent and that said Letters Patent is hereby corrected as shown below:

Column 1, line 9, delete "copending" and insert ---- co-pending ----.

Column 3, line 65, after "ring member" insert a comma ---- , ----.

Signed and Sealed this

Sixth Day of January, 1987

Attest:

DONALD J. QUIGG

*Attesting Officer*  *Commissioner of Patents and Trademarks*